Aug. 11, 1942.　　　W. ANSCOTT　　　2,292,732
UNIVERSAL INDICATOR FOR AIRCRAFT
Filed Oct. 26, 1939　　　2 Sheets-Sheet 1
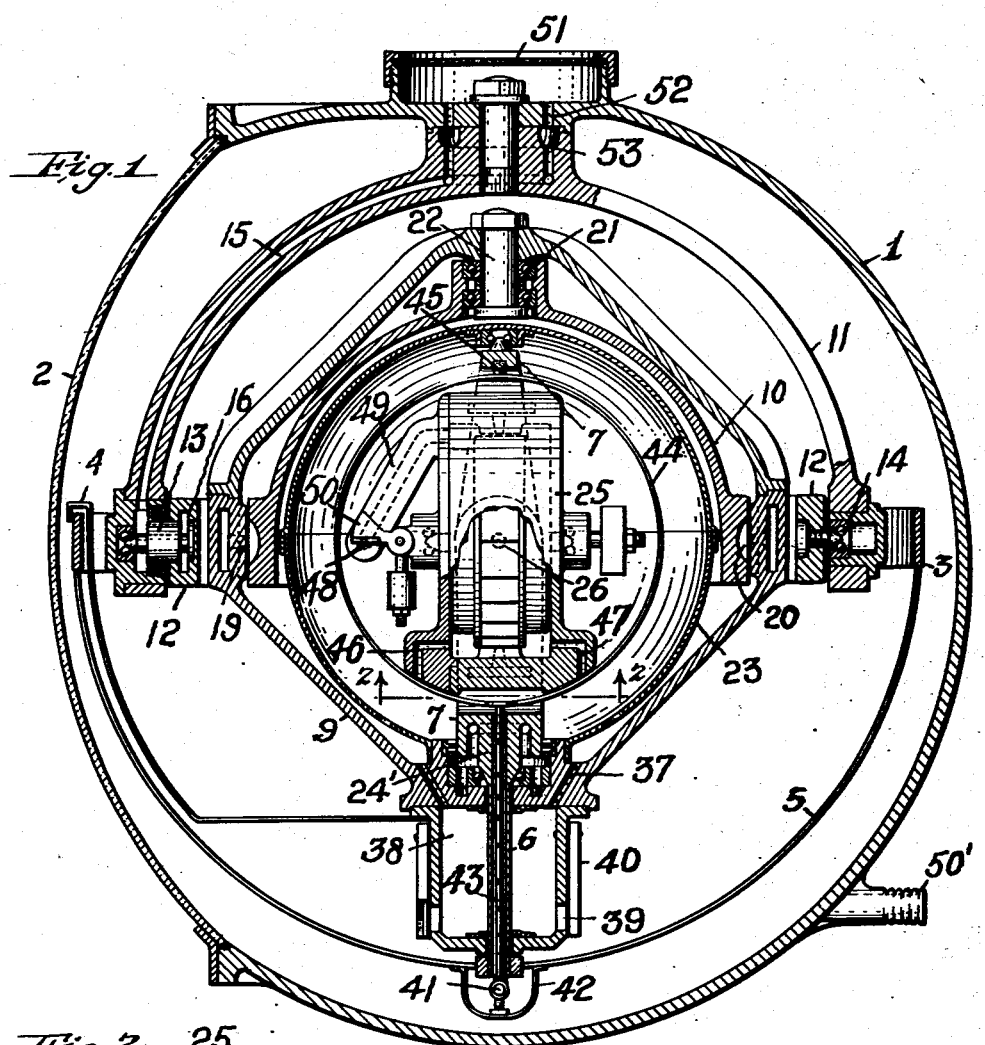
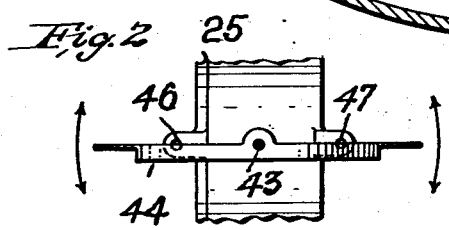
INVENTOR
William Anscott,
BY
Herbert H. Thompson
his ATTORNEY.

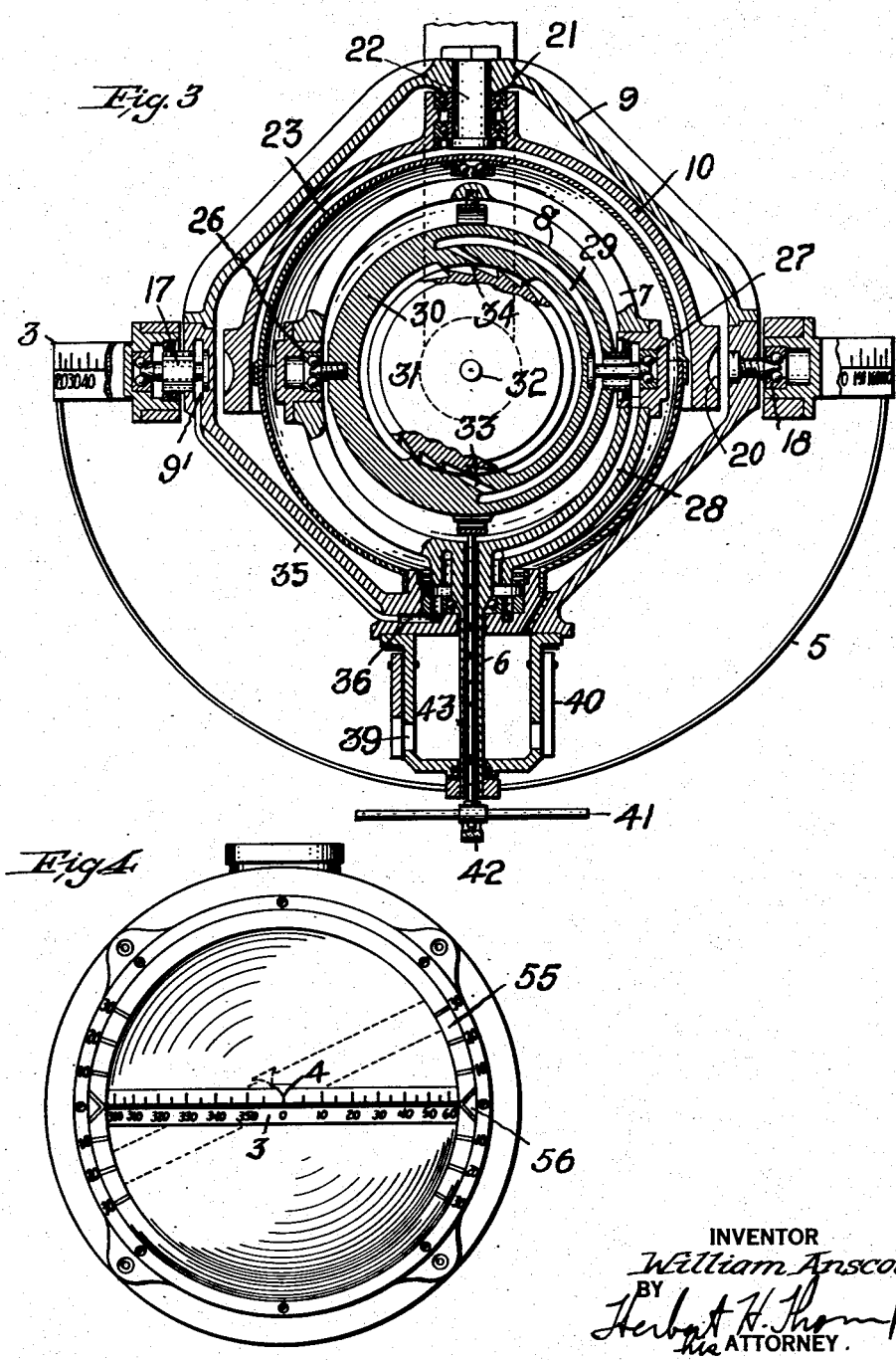

UNITED STATES PATENT OFFICE 2,292,732

UNIVERSAL INDICATOR FOR AIRCRAFT

William Anscott, Jamaica, N. Y., assignor to Sperry Gyroscope Company, Inc., Brooklyn, N. Y., a corporation of New York Application October 26, 1939, Serial No. 301,353

9 Claims. (Cl. 33—222)

This invention relates to an attitude indicator especially adapted for aircraft, which shows in one instrument and on one face the attitude of the craft in all three planes, that is, its longitudinal inclination or pitch, its lateral inclination or roll angle, and its course or heading in azimuth.

Referring to the drawings, showing the preferred form of my invention,

Fig. 1 is a vertical section through my combined instrument.

Fig. 2 is a sectional detail taken on line 2—2 in Fig. 1.

Fig. 3 is a vertical section taken at right angles to Fig. 1, but omitting the exterior casing.

Fig. 4 is a face view of the device on a smaller scale.

The entire instrument is shown as enclosed within a casing 1 having a front window 2 through which the annular indicator 3 may be seen. Said indicator is shown in the form of a side reading compass card, but it is so connected to the instrument that it not only rotates in azimuth relative to its housing to show compass heading or course, but also is translated up and down and tilted laterally relative to its housing to show the pitch and roll angles, respectively. The compass readings are taken with reference to index 4 mounted to participate in all movements of the card except azimuthal movements. Card 3 shows the bank of the aircraft, as shown in dotted lines in Fig. 4, the banking angle being read on the graduations 55 along the side of the instrument. The pitch, of course, is shown by the up and down movement of the card with reference to the indexes 56. The card is shown as secured to a light frame 5 secured at its bottom to vertical stem 6 projecting downwardly from the vertical ring 7 of a directional gyroscope 8. The reference index 4, on the other hand, is secured to the bottom of the casing 9 of another rotor 10 mounted for spinning about a normally vertical axis and constituting a gyro-vertical or artificial horizon, within which the directional gyroscope is mounted.

Said gyro-vertical is shown as universally mounted within the outer casing 1 by means of a U-shaped frame 11 within which the gimbal ring 12 is pivoted on a fore and aft axis by means of trunnions 13 and 14. Preferably, one of said trunnions at least is made hollow so that the air used for spinning and controlling both gyroscopes may pass from the passageway 15 in the frame 11 to annular passageway 16 in the gimbal ring. The gimbal ring, in turn, supports the rotor casing 9 on a transverse axis as by means of trunnions 17 and 18, one of which is made hollow to pass air from the gimbal ring into the rotor casing, whence it emerges through nozzle or nozzles 19 to impinge against blades or buckets 20 in the periphery of the rotor 10. Said rotor is shown as in the form of an inverted bowl journaled at its top in vertical bearings 21 on a stud 22 secured in the top of the rotor case. The rotor 10 will therefore stabilize the rotor bearing casing 9 against both pitch and roll.

Within said hollow rotor I mount a hollow sphere or housing 23 within which is supported said directional gyroscope. As shown, the vertical ring 7 of said gyroscope is mounted therein for turning about a vertical axis, the rotor casing 25 being journaled in said vertical ring on a horizontal axis by means of trunnions 26 and 27, one of which is again made hollow to pass air from the channel 28 in the rotor bearing into the channel 29 in the rotor bearing frame or casing 30. The rotor proper, 31, is shown as mounted on a horizontal spinning axis 32 within the rotor casing 25. The rotor may be spun by one or more air jets 33 leading from channel 29 in the rotor casing to within the casing and directing jets against buckets 34 in the rotor. While I have illustrated both rotors as air spun, it is to be understood that my invention is not limited to any particular method of spinning the gyro rotors.

The lower trunnion 24' of the vertical ring is shown as provided with the extension 6 above referred to, which carries the light framework 5 supporting the compass card 3. It is likewise made hollow so that a portion of the air entering the channel 9' in the outer bearing casing 9 may be led into the rotor casing 25 of the directional gyroscope. For this purpose there is shown a pipe 35 connecting said channel 9' with a passage 36 in the bottom of casing 9, which in turn leads air into the hollow bearing and into channel 28. The air used in spinning the rotor 10 is shown as escaping through channels 37 downwardly into a chamber 38 on the bottom of the casing, whence it escapes laterally through four ports 39 controlled by pendulous shutters 40 for the purpose of erecting the entire system for maintaining it vertical, as well understood in the art.

Preferably, I provide a coercive control for the directional gyroscope as well to prevent it wandering, as by means of a compass magnet 41. Said magnet is shown as pivoted at the bottom in a U-shaped extension 42 on framework 9 and as having a small shaft 43 extending upwardly and carrying at its top a light ring 44, which in turn is journaled at the top in a bearing 45 within the vertical ring 7.

A portion of the used air from within the casing 25 is shown escaping downwardly through laterally spaced ports 46 and 47 which are normally partially covered by the bottom portion of the ring 44 (see Fig. 2). In case relative turning occurs between the directional gyroscope and the compass loop 44, one of the ports 46 or 47 will be covered more than the other, resulting in an unequal torque on the gyroscope about its horizontal axis 26—27, causing the gyroscope to follow the ring and hence the magnetic needle in azimuth.

Another portion of the air from the rotor casing 25 is shown as escaping laterally through oppositely directed ports 48 in a hollow arm 49 extending downwardly from the side of the rotor casing. Said ports are normally equally partially covered by oppositely facing pendulous shutters 50, but on relative tilt of the directional gyro case and pendulum, a torque is exerted about the vertical axis to correct the tilt, as well understood in the art, and as shown in the copending application of Leslie F. Carter, now Patent No. 2,199,850, dated May 7, 1940, for Gyro magnetic compasses.

The system is shown as of the vacuum type, air being continuously exhausted through the pipe coupling 50' and entering through screen 51 at the top of the case, whence it passes downwardly through ports and channels 52 and 53, thence into the channel 15, above described, whence it passes to the spinning jets and the other auxiliary mechanism.

From the foregoing description, certain improvements and advantages over prior art constructions will appear. It will be noted that the axes of freedom of both gyroscopes and of the card 3 lie in the same horizontal and vertical planes and, in fact, intersect at a common center. By this means the card may be used to give readings in all planes and the directional gyroscope or gyro-magnetic compass, including the magnetic needle, is stabilized against rolling and pitching. The magnetic needle therefore may be pivoted about a vertical axis fixed to the gyroscope so that it may be balanced and remains relatively uninfluenced by acceleration forces. It will furthermore be noted that the magnetic needle is placed some distance from the rotor or other bearings of the gyroscopes, so that it will be relatively uninfluenced by stray magnetic fields around the bearings and the rotor shafts.

It will also be noted that in this construction oscillation of the casing 25 about its horizontal axis 26 will not affect the air jets 46, 47, since the ring 44 carried by the magnetic needle has its center of curvature at the center of the gyro wheel and is symmetrical.

As many changes could be made in the above construction and many apparently widely different embodiment of this invention could be made without departing from the scope thereof, it is intended that all matter contained in the above description or shown in the accompanying drawings shall be interpreted as illustrative and not in a limiting sense.

Having described my invention, what I claim and desire to secure Letters Patent is:

1. In a combined direction and attitude indicator, a supporting frame universally mounted for freedom about a pair of coplanar normally horizontal axes, a hollow rotor mounted therein for spinning about a normally vertical axis, all of said axes intersecting in a common point, a directional gyroscope including a vertical ring in said frame also mounted for freedom about said vertical axis, and a rotor bearing casing pivoted in said ring for oscillation about a horizontal axis lying in the plane of said other horizontal axes, and a compass card secured to an extension from said vertical ring, and extending exteriorly of said frame, whereby said card shows the attitude of the craft as well as the heading.

2. A combined direction and attitude indicator as claimed in claim 1, having an auxiliary magnetic compass needle mounted on said vertical ring for freedom about the vertical axis, and means responsive to relative turning of said ring and needle in azimuth for applying a torque to said directional gyroscope about its horizontal axis for causing the gyroscope to follow the needle.

3. A combined direction and attitude indicator as claimed in claim 1, in which substantially half the directional gyroscope lies within said hollow rotor and said magnetic needle is positioned remotely from the rotor bearings of both rotors.

4. In a gyro-magnetic compass, the combination with an outer housing, a gyroscope therein including a vertical ring mounted therein for turning about a vertical axis, and a rotor casing pivoted in said ring for oscillation about a horizontal axis, a magnetic needle pivoted about said vertical axis on an extension from said vertical ring so as to be remote from the gyroscope, a second light vertical ring turnable with said needle within said first vertical ring, and means, including the second vertical ring, responsive to relative turning of said second ring and said rotor casing in azimuth for applying a coercive torque to the gyroscope in a direction to cause it to follow said needle.

5. In a gyro-magnetic compass, the combination with an outer housing, a gyroscope therein including a vertical ring mounted therein for turning about a vertical axis, and a rotor casing pivoted in said ring for oscillation about a horizontal axis, a magnetic needle pivoted on an extension from said vertical ring so as to be remote from the gyroscope, a second light vertical ring turnable with said needle within said vertical ring, air ports on opposite sides of said vertical axis partially covered by said second vertical ring and adapted to exert torques about the horizontal axes of said casing on relative wandering of the gyroscope, said torques being in a direction to cause the gyroscope to precess to follow the needle in azimuth.

6. In a gyro-magnetic compass, the combination with an outer housing, a vertical ring mounted therein for turning about a vertical axis, a rotor casing pivoted therein for oscillation about a horizontal axis, a magnetic needle pivoted on an extension from said vertical ring so as to be remote from the gyroscope, a shutter curved about said oscillation axis and turning with said needle in said vertical ring, said casing having air ports on opposite sides of said vertical axis partially covered by said shutter and adapted on relative wandering of the gyroscope and needle to exert torques about the horizontal axes of said casing in a direction to cause the gyroscope to precess to follow the needle in azimuth.

7. The combination of a gyro-magnetic compass as claimed in claim 6, and a universally suspended gyro-vertical in which said vertical ring is mounted within the universally suspended gyro-vertical to stabilize said ring about both horizontal axes, and an indicator secured to said ring showing both attitude and course.

8. In a gyro-magnetic compass combination, a gyro-vertical, including a rotor bearing frame, means for supporting the frame of the gyro-vertical to have freedom about mutually perpendicular horizontal axes, a magnetic compass pivoted on the frame for turning about a vertical axis stabilized by said gyro-vertical, a directional gyroscope including a vertical ring mounted upon the frame of said gyro-vertical to have freedom about vertical and horizontal axes so that the axes of freedom of both the gyro-vertical and the directional gyroscope intersect at a common center, and means responsive to relative turning of said directional gyroscope and magnetic compass in azimuth for applying a torque on the horizontal axis of the directional gyroscope to cause it to precess in azimuth to follow said magnetic compass.

9. In a gyro-magnetic compass combination, a gyro-vertical including a rotor bearing frame, means for supporting the rotor frame of the gyro-vertical to have freedom about mutually perpendicular axes, a rotor journaled in said frame having a normally vertical spin axis, a magnetic compass pivoted on the frame for turning about a vertical axis arranged in coaxial relation with respect to the axis of spin of the gyro-vertical rotor, a directional gyroscope including a vertical ring mounted upon the frame of said gyro-vertical to have freedom about a horizontal axis and a vertical axis, which last named axis is also arranged in coaxial relation with respect to the axis of spin of the gyro-vertical rotor, and means responsive to relative turning of said directional gyroscope and magnetic compass in azimuth for applying a torque on the horizontal axis of said directional gyroscope to cause it to precess in azimuth to follow said magnetic compass.

WILLIAM ANSCOTT.